United States Patent
Shishkin

(10) Patent No.: US 11,055,185 B2
(45) Date of Patent: Jul. 6, 2021

(54) METHOD AND SYSTEM FOR GLOBAL SNAPSHOTS OF DISTRIBUTED STORAGE

(71) Applicant: Huawei Technologies Co., Ltd., Shenzhen (CN)

(72) Inventor: Eduard Shishkin, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/510,183

(22) Filed: Jul. 12, 2019

(65) Prior Publication Data

US 2019/0332500 A1 Oct. 31, 2019

Related U.S. Application Data

(63) Continuation of application No. PCT/EP2017/050652, filed on Jan. 13, 2017.

(51) Int. Cl.
- *G06F 11/14* (2006.01)
- *G06F 16/11* (2019.01)
- *G06F 3/06* (2006.01)

(52) U.S. Cl.
CPC ......... *G06F 11/1471* (2013.01); *G06F 3/065* (2013.01); *G06F 3/067* (2013.01); *G06F 3/0614* (2013.01); *G06F 3/0643* (2013.01); *G06F 3/0689* (2013.01); *G06F 16/128* (2019.01); *G06F 2201/84* (2013.01)

(58) Field of Classification Search
CPC ............ G06F 11/1471; G06F 11/1469; G06F 11/1664; G06F 16/128; G06F 3/0624; G06F 3/0643; G06F 3/065; G06F 3/067; G06F 3/0689; G06F 3/0665; G06F 3/062; G06F 3/0604; G06F 2201/84; H04L 67/1095
See application file for complete search history.

(56) References Cited

U.S. PATENT DOCUMENTS

| | | | |
|---|---|---|---|
| 7,430,568 B1 | 9/2008 | Dekoning et al. | |
| 2014/0006465 A1* | 1/2014 | Davis | G06F 16/183 707/827 |
| 2014/0280438 A1 | 9/2014 | Shishkin et al. | |
| 2015/0212897 A1* | 7/2015 | Kottomtharayil | G06F 11/00 714/20 |
| 2016/0205182 A1* | 7/2016 | Lazar | G06F 3/067 709/219 |

OTHER PUBLICATIONS

Ohad Rodeh, "B-trees, Shadowing, and Clones," IBM Haifa Research Labs, ACM Transactions on Computational Logic, vol. V, No. N, pp. 1-26, ACM Transactions on Computational Logic (Aug. 2007).
"Logical Volume Management," Retrieved from the internet: https://en.wikipedia.org/wiki/Logical_Volume_Management, pp. 1-7, Wikipedia, (Retrieved Aug. 29, 2019).

\* cited by examiner

*Primary Examiner* — Hiep T Nguyen

(74) *Attorney, Agent, or Firm* — Leydig, Voit & Mayer, Ltd.

(57) ABSTRACT

A storage manager for managing storage of files on a distributed logical volume includes a configuration manager configured to manage an archive of configurations of the distributed logical volume, and a snapshot manager configured to create a global snapshot of the distributed logical volume and, in response to a roll-back request, restore a previous global snapshot of the distributed logical volume based on a stored configuration of the distributed logical volume and stored subvolume snapshots of subvolumes of the distributed logical volume.

20 Claims, 11 Drawing Sheets

METHOD AND SYSTEM FOR GLOBAL SNAPSHOTS OF DISTRIBUTED STORAGE

CROSS-REFERENCE TO RELATED APPLICATIONS

This application is a continuation of International Application No. PCT/EP2017/050652, filed on Jan. 13, 2017, the disclosure of which is hereby incorporated by reference in its entirety.

TECHNICAL FIELD

The present invention relates to a storage manager and to a method for managing storage of files. The present invention also relates to a computer-readable storage medium storing program code, the program code comprising instructions for carrying out such a method.

BACKGROUND

Modern distributed storage systems operate with a large number of files and devices. Resource-intensive applications running on high-performance computing systems have become more and more significant nowadays. Such applications deal with large amounts of data that need to be stored somewhere. Along with the growth of storage volumes, the cost of volume operations increases (because of an increase in the number of IO requests needed for re-balancing). Sometimes users need to roll back volume operations (e.g. operations of adding or removing a device to or from a logical volume). Currently, the option for such rollback is performing the opposite volume operation. For example, if one needs to roll back adding a device, then one should launch an operation of removing the device, which will re-distribute objects (files) from the device to be removed among the remaining devices. This procedure can be very resource-intensive. Non-completed volume operations, in turn, can block other operations that the user intends to make on the volume.

Modern distributed storage systems allow quick roll back of regular file operations (e.g. creating, writing, removing, etc. a file), but there is still a need for improved roll-back functionality of volume operations.

SUMMARY OF THE INVENTION

The present application describes a storage manager and a method for managing storage of files, wherein the storage manager and the method for managing storage of files overcome one or more of the above-mentioned problems of the prior art.

A first aspect of the invention provides a storage manager for managing storage of files on a distributed logical volume, the storage manager comprising:
- a configuration manager configured to manage an archive of configurations of the distributed logical volume, and
- a snapshot manager configured to create a global snapshot of the distributed logical volume and, in response to a roll-back request, restore a previous global snapshot of the distributed logical volume, based on a stored configuration of the distributed logical volume and stored subvolume snapshots of subvolumes of the distributed logical volume.

Creating a global snapshot of a distributed logical volume can comprise creating subvolume snapshots of all subvolumes of the distributed logical volume. Creating a snapshot of a subvolume can involve copying all data of this subvolume to a different location. For example, the storage manager can be connected to a snapshot storage device which is configured to store copies of the subvolumes. In other embodiments, creating a snapshot does not involve copying the entire subvolume, but rather a pointer is created to the subvolume. For example, a Copy-on-Write implementation can provide that when a subvolume has been snapshotted, and a process intends to write on this subvolume, data of the subvolume are copied before the process is allowed to write to the snapshot. Thus, the (possibly significant) effort of copying the subvolume is postponed until it is actually required.

The storage manager of the first aspect provides users with an option to quickly roll back not only regular operations (e.g. creating or deleting a file on a logical volume), but also volume operations (e.g. adding and removing a device to/from a logical volume). For this the storage manager of the first aspect provides a functionality of global snapshots of the distributed logical volume. Thus, at any moment the user can make a global snapshot of the system, with the possibility to quickly roll the system back to the global state that the system had at the moment of creation of the global snapshot.

The storage manager of the first aspect can decompose a global volume operation into a set of regular operations on simple subvolumes, which should provide a service of local snapshots. In particular, a special archive of configurations can be maintained. Every such configuration can define a "distribution topology," i.e. it can aggregate simple volumes into compound (logical) volumes by some way. Thus, any operation on the compound volume can be represented as a set of regular operations on its simple subvolumes. Respectively, any rollback of a volume operation can be implemented as rollbacks of regular operations on those subvolumes with the deploying a proper distributing configuration from the mentioned archive. Preferably, all simple subvolumes possess the functionality of local snapshots. In particular, they all should be able to rollback regular operations. Thus, the overall problem can be reduced to a number of smaller tasks, each of which either have a ready solution (local snapshots of simple subvolumes) or can be solved by the storage manager of the first aspect (via providing proper distributing configuration from the mentioned archive).

In a first implementation of the storage manager according to the first aspect, the storage manager further comprises a subvolume manager that is configured to manage subvolume snapshots of a subvolume of the distributed logical volume, wherein the snapshot manager is configured to transmit a request to perform an operation on a subvolume snapshot.

The operation can be e.g. initialization, finalization, creation, deletion of subvolume snapshots, and roll back of the subvolumes to existing subvolume snapshots.

The storage manager of the first implementation has the advantage that the operation of creating a global snapshot can be broken down to smaller simpler operations such as the creation of subvolume snapshots.

In a second implementation of the storage manager according to the first aspect as such or according to the first implementation of the first aspect, wherein the snapshot manager is configured to keep a reference counter of a subvolume of the distributed logical volume, wherein the reference counter indicates a number of stored global snapshots that comprise a subvolume snapshot of the subvolume.

This has the advantage that the storage manager can inform a user when a subvolume is not used anymore, so that a storage device corresponding to the subvolume snapshot can be safely removed from the machine.

In a third implementation of the storage manager according to the first aspect as such or according to any of the preceding implementations of the first aspect, the storage manager further comprises a snapshot creation module which is configured to, in response to a global snapshot creation request, store information about a current configuration of the distributed logical volume, transmit a request to create snapshots of the subvolumes of the distributed logical volume and create a unique ID corresponding to the stored information and the stored global snapshot.

The storage manager of the third implementation has the advantage that it can create all data structures required so that the created global snapshot can be used in a later roll-back operation.

In a fourth implementation of the storage manager according to the first aspect as such or according to any of the preceding implementations of the first aspect, the storage manager further comprises a snapshot deletion module which is configured to, in response to a global snapshot deletion request, delete information about a corresponding configuration of the distributed logical volume and to transmit a request to delete one or more subvolume snapshots of the global snapshot.

The storage manager of the fourth implementation has the advantage that previously created global snapshots that are no longer required are deleted and thus space is freed.

In a fifth implementation of the storage manager according to the first aspect as such or according to any of the preceding implementations of the first aspect, the storage manager further comprises a restoration module which is configured to, in response to a global snapshot restoration request, restore a corresponding configuration of a distributed storage volume and to transmit a request to restore corresponding subvolume snapshots on the subvolumes of the distributed logical volume.

The storage manager of the fifth implementation has the advantage that it can efficiently restore the distributed logical volume.

In a sixth implementation of the storage manager according to the first aspect as such or according to any of the preceding implementations of the first aspect, the storage manager further comprises a snapshot visualization module configured to parse a data structure comprising information about stored global snapshots and to display a parsing result.

The storage manager of the sixth implementation has the advantage that information about the stored global snapshots can be visualized for a user and thus a user can better decide which volume operations to roll-back. The data structure can be e.g. a tree structure. In this case, also the visualization can be a tree visualization.

In a seventh implementation of the storage manager according to the first aspect as such or according to any of the preceding implementations of the first aspect, the storage manager further comprises a global snapshot initialization module, configured to allocate resources and to create data structures needed to manage global snapshots.

In particular, if the snapshots are implemented as copies of the subvolumes, it is important to manage the resources for storing the snapshots. For example, the global snapshot initialization module may check whether sufficient space for the subvolume snapshots is available. If sufficient space is available, it can reserve the space for the subvolume snapshots. If insufficient space is available, the global snapshot initialization module can generate an error message to indicate the insufficient space to the user.

In an eighth implementation of the storage manager according to the first aspect as such or according to any of the preceding implementations of the first aspect, the storage manager further comprises a global snapshot finalization module, configured to release the resources allocated by the global snapshot initialization module.

In particular, the snapshot finalization module can be configured to release resources that were required during the creation of the global snapshots, but that are no longer required after the snapshots have been created.

A second aspect of the invention refers to a method for managing storage of files on a distributed logical volume, the method comprising:
  managing an archive of configurations of the distributed logical volume,
  creating a global snapshot of the distributed logical volume, and,
  in response to a roll-back request, restoring a previous global snapshot of the distributed logical volume, based on a stored configuration of the distributed logical volume and stored subvolume snapshots of subvolumes of the distributed logical volume.

The methods according to the second aspect of the invention can be performed by the storage manager according to the first aspect of the invention. Further features or implementations of the method according to the second aspect of the invention can perform the functionality of the storage manager according to the first aspect of the invention and its different implementation forms.

In a first implementation of the method for managing storage of files of the second aspect, the method further comprises managing subvolume snapshots of a subvolume of the distributed logical volume and transmitting a request to perform an operation on a subvolume snapshot.

In a second implementation of the method for managing storage of files of the second aspect as such or according to the first implementation of the second aspect, the method further comprises keeping a reference counter of a subvolume of the distributed logical volume, wherein the reference counter indicates a number of stored global snapshots that comprise a subvolume snapshot of the subvolume.

In a third implementation of the method for managing storage of files of the second aspect as such or according to any of the preceding implementations of the second aspect, the method further comprises in response to a global snapshot creation request, storing information about a current configuration of the distributed logical volume, transmitting a request to create snapshots of the subvolumes of the distributed logical volume and creating a unique ID corresponding to the stored information and the stored global snapshot.

In a fourth implementation of the method for managing storage of files of the second aspect as such or according to any of the preceding implementations of the second aspect, the method further comprises, in response to a global snapshot deletion request, deleting information about a corresponding configuration of the distributed logical volume and transmitting a request to delete one or more subvolume snapshots of the global snapshot.

A third aspect of the invention refers to a computer-readable storage medium storing program code, the program code comprising instructions that, when executed by a processor, cause the processor to carry out the method of the second aspect or one of the implementations of the second aspect.

BRIEF DESCRIPTION OF THE DRAWINGS

To illustrate the technical features of embodiments of the present invention more clearly, the accompanying drawings provided for describing the embodiments are introduced briefly in the following. The accompanying drawings in the following description are merely some embodiments of the present invention, modifications on these embodiments are possible without departing from the scope of the present invention as defined in the claims.

DETAILED DESCRIPTION OF THE EMBODIMENTS

Figure 1:
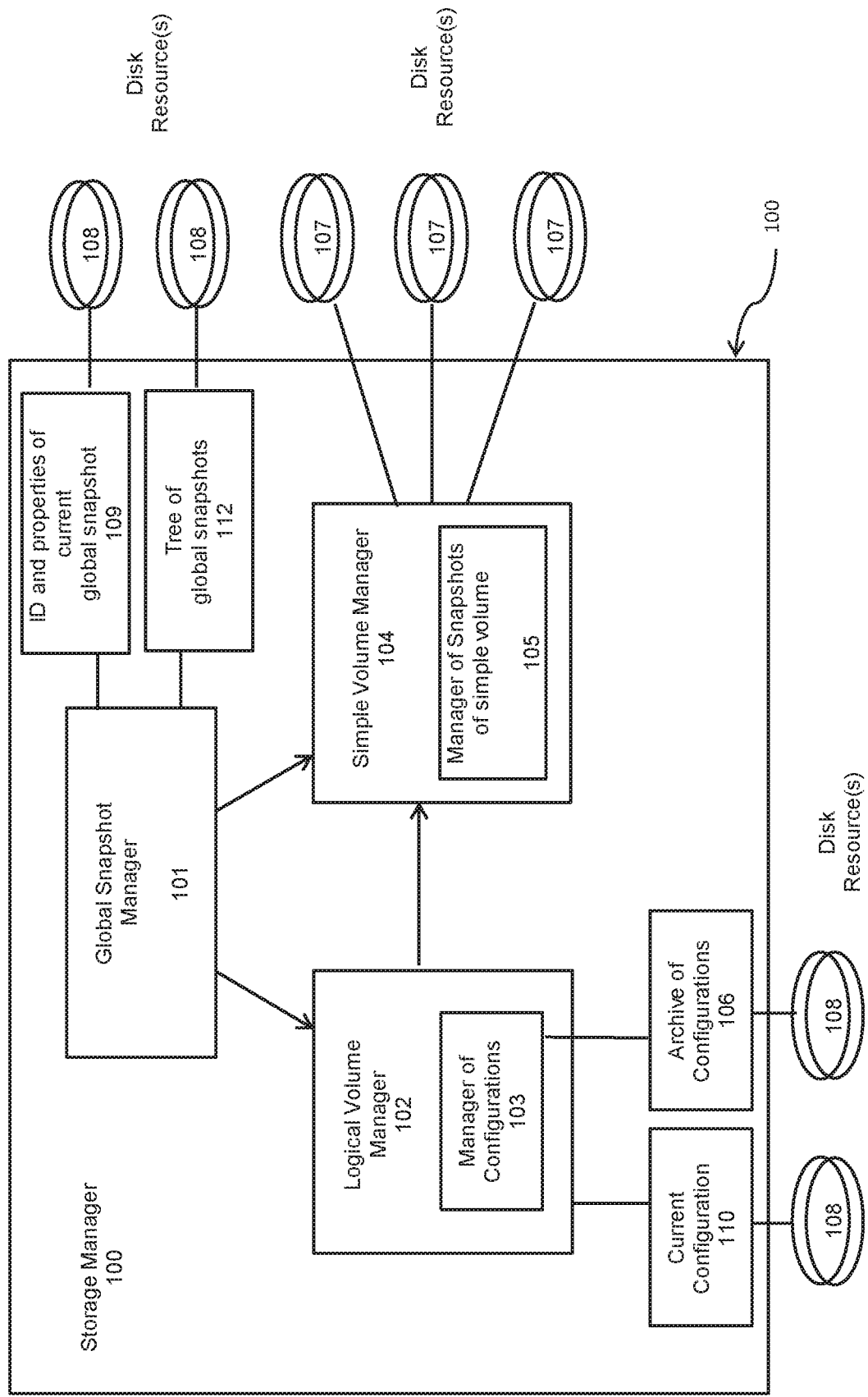
FIG. 1 is a schematic illustration of components of a distributed storage system with a storage manager, FIGS. 2 schematically illustrates differences between a distributed system with global snapshots and a distributed system with non-global snapshots.

FIG. 1 is a schematic illustration of a storage system that comprises a storage manager 100.

Embeddings (client-supplier relationships between modules) are denoted by nesting of rectangles (client includes a supplier). In some cases, client-supplier relationships are denoted by arrows with a start at the client and an end at the supplier. Any data structure managed by some module is connected with that module by a simple line (without arrows).

Figure 2:
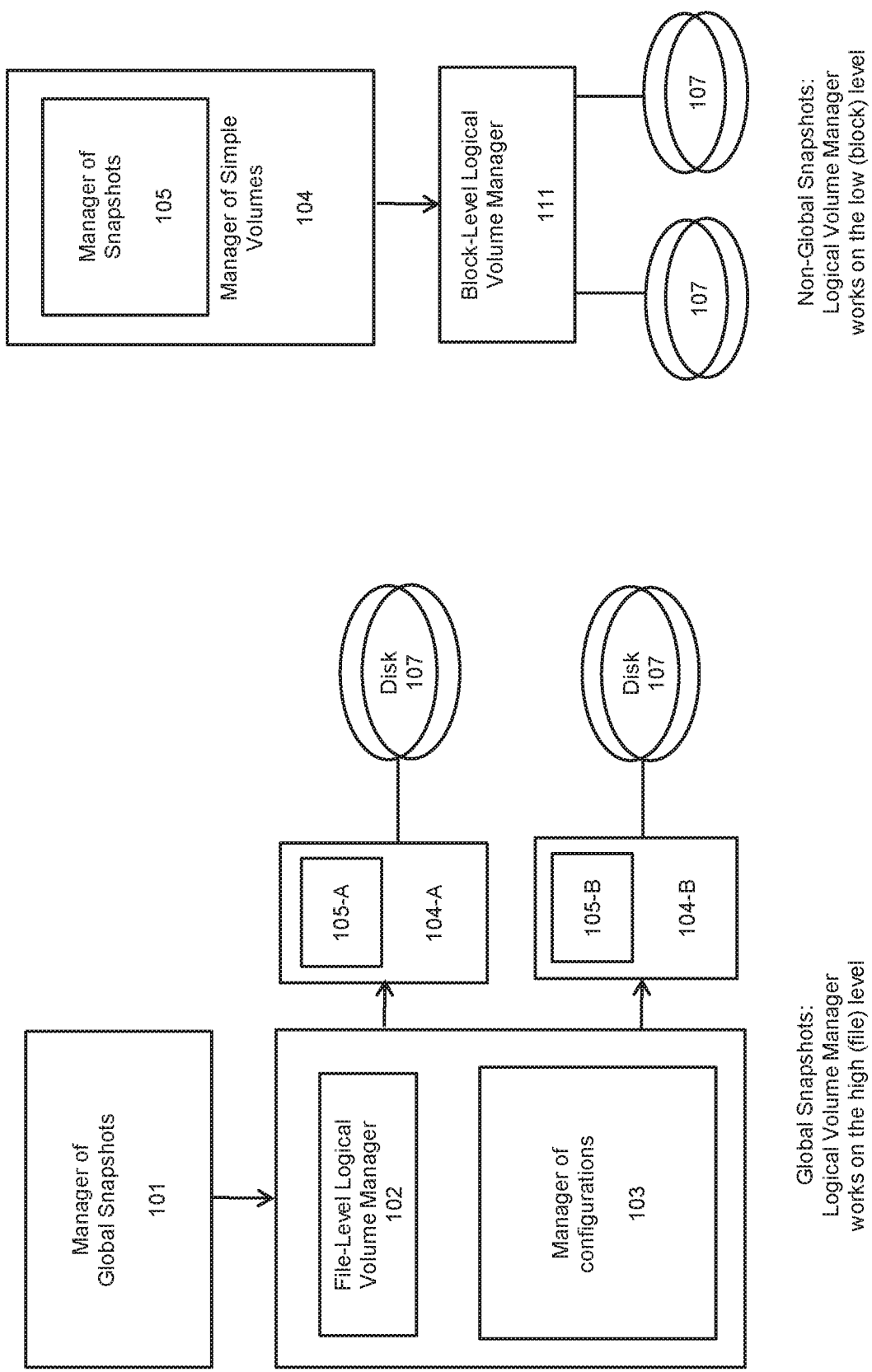

In the systems illustrated in FIGS. 1 and 2, storage devices 107, 108 provide storage service. These can be block or character devices including e.g. hard drives, floppy drives, tapes, solid-state drives etc.

A simple volume manager 104 stores named objects within a single storage device 107. That is, the simple volume manager 104 packs pairs (object, name) to a set of blocks, or characters (depending on the type of device 107) and requests a storage device 107 to store those blocks or characters at specified offsets (addresses). Furthermore, the simple volume manager 104 requests a storage device 107 to read blocks at specified addresses and extract named objects from them.

In addition to storage operations the manager 104 can implement various regular operations on the stored named objects (e.g. read, write, truncate, rename, etc. a file). An example of a manager 104 is a local file system of the operating system. In this example, named objects are files, and the manager 104 implements operations of read, write, rename, truncate, etc.

In addition to operations described below in more detail, the manager 104 provides a snapshot functionality, which includes operations such as snapshots initialization, creation, restoration, deletion and finalization, implemented by the manager of snapshots of simple volume 105, which is an example of a subvolume manager. An example of implementation of the subvolume manager 105 can be found in the paper Rodeh, O., 2008. B-trees, shadowing, and clones. ACM Transactions on Storage (TOS), 3(4), p. 2.

On a single device 107, the simple volume manager 104 can maintain one or more isolated namespaces. That is, the simple volume manager 104 can store and distinguish different objects with the same name on a storage device 107.

A logical volume manager 102 stores named objects in a set of one or more storage devices 107. For this purpose, the logical volume manager 102 maintains a current configuration 110, which maps every named object (i.e. a pair (name, object)) to a set of devices 107 and asks their modules 104 to store that named object (or its parts) on the devices determined by such mapping.

The current configuration 110 includes: a) number and pointers to simple volumes 104, being in one-to-one correspondence between devices 107; b) a table, which determines distribution of named objects among the volumes determined by (a). Table (b) can be a distributed hash table. The configuration 110 can be represented by any suitable data structures. An example of a configuration 110 is a GlusterFS's volfile. Between mount sessions the configuration 110 can be stored on storage device(s) 108.

In addition to storage operations mentioned above, the logical volume manager 102 can implement various "regular" operations (i.e. read, write, truncate, rename, etc.) on the set of stored named objects. For this purpose the logical volume manager 102 determines a set of devices and asks their managers 104 (backend storage) for the respective service. The logical volume manager 102 can be a distributed (parallel, cluster, network, etc.) file system.

Different devices 107 can be associated with different simple volume managers 104, as is shown in FIG. 2. They can implement different concepts in storage, taking into consideration different nature of devices, different geometric parameters of devices and different levels of their implementation (high-end devices, commodity devices, etc). A simple volume is a triple: single device, a simple volume manager associated with this device and a counter of references to that volume. The reference counter can be stored on respective device 107.

FIG. 2 illustrates a difference between a system with global snapshots (shown in FIG. 2a) and a system with non-global snapshots (shown in FIG. 2b). In particular, a difference is in the layout of their respective volume managers 102, 111 relative to the components of the storage stack 104, 107. The distributed system, which provides non-global snapshots (FIG. 2b) possesses a low-level logical volume manager 111 which aggregates volumes on the low (block) level. The distributed system, which provides global snapshots (FIG. 2a) possesses a high-level logical volume manager 102, which aggregates volumes on the high (file) level. An example of the block-level logical volume manager 111 is the Linux Logical Volume Manager (LVM), which works on the block layer.

Snapshot functionality means that a user at any time can make a snapshot of his system with a possibility to quickly roll the system back to the local state that the system had at the moment of snapshot creation. The snapshots offered by modern distributed storage systems are actually local, not global. In particular, among the set of all operations made since the moment of snapshot creation, only a subset of regular operations can be rolled back. For example, snapshots provided by ZFS and Btrfs file systems are not global. Snapshots provided by the LVM of the Linux block layer are also not global. Such local snapshot functionality, as provided by the system on the right side of FIG. 2 is not enough, as it does not resolve a scalability problem as mentioned above.

In addition to the operations mentioned above, the file-level logical volume manager 102 of the system shown on the left of FIG. 2 can implement volume operations such as adding or removing a device to/from the set of devices 107. When adding a new device, the logical volume manager 102 moves a portion of named objects form each device of the old set to the new device, and sets the reference counter of the new simple volume to 1. When removing a device, the logical volume manager 102 distributes all named objects from the device to be removed among the remaining devices in accordance with current configuration 110, and decrements the reference counter of the volume to be removed. Volume operations can update current configuration 110. An example of a logical volume manager 102 can be a distributed (clustered, parallel, network) file system.

The manager of configurations 103 is an example of a configuration manager. It manages an archive of configurations 106.

The archive of configurations 106 can be represented by a key-value store implemented by some data structure (e.g. B-tree). It can be stored on a set of block or character devices 108.

The global snapshot manager module 101 maintains a unique identifier and properties 109 of currently deployed global snapshot. Between mount sessions the unique identifier and properties 109 can be stored on disk(s) 108. Identifier 109 can be used to provide correctness of operations and consistency. Properties of the global snapshot can be specified by user at snapshot creation time. Those properties may affect regular and snapshot operations mentioned above, as well as global snapshot operations implemented by global snapshot manager 101. For example, the currently deployed global snapshot can be read-only. It means that any modifying operation on the logical volume (e. g. create, write, delete a file, create a global snapshot, etc.) will fail.

The global snapshot manager module 101 maintains a tree of global snapshots 112, which can be used for visualization of the set of global snapshots. Nodes of the tree 112 contain items marked by snapshot identifiers. Every such item can contain any information about the corresponding global snapshot. Every such item can be a parent of a child node in the tree. Every parent has not more than one child node in the tree. The tree of snapshots can be stored on disk(s) 108.

If the archive of configurations 106 is not empty, then it always contains a current configuration 110 keyed with identifier 109.

Figure 3:
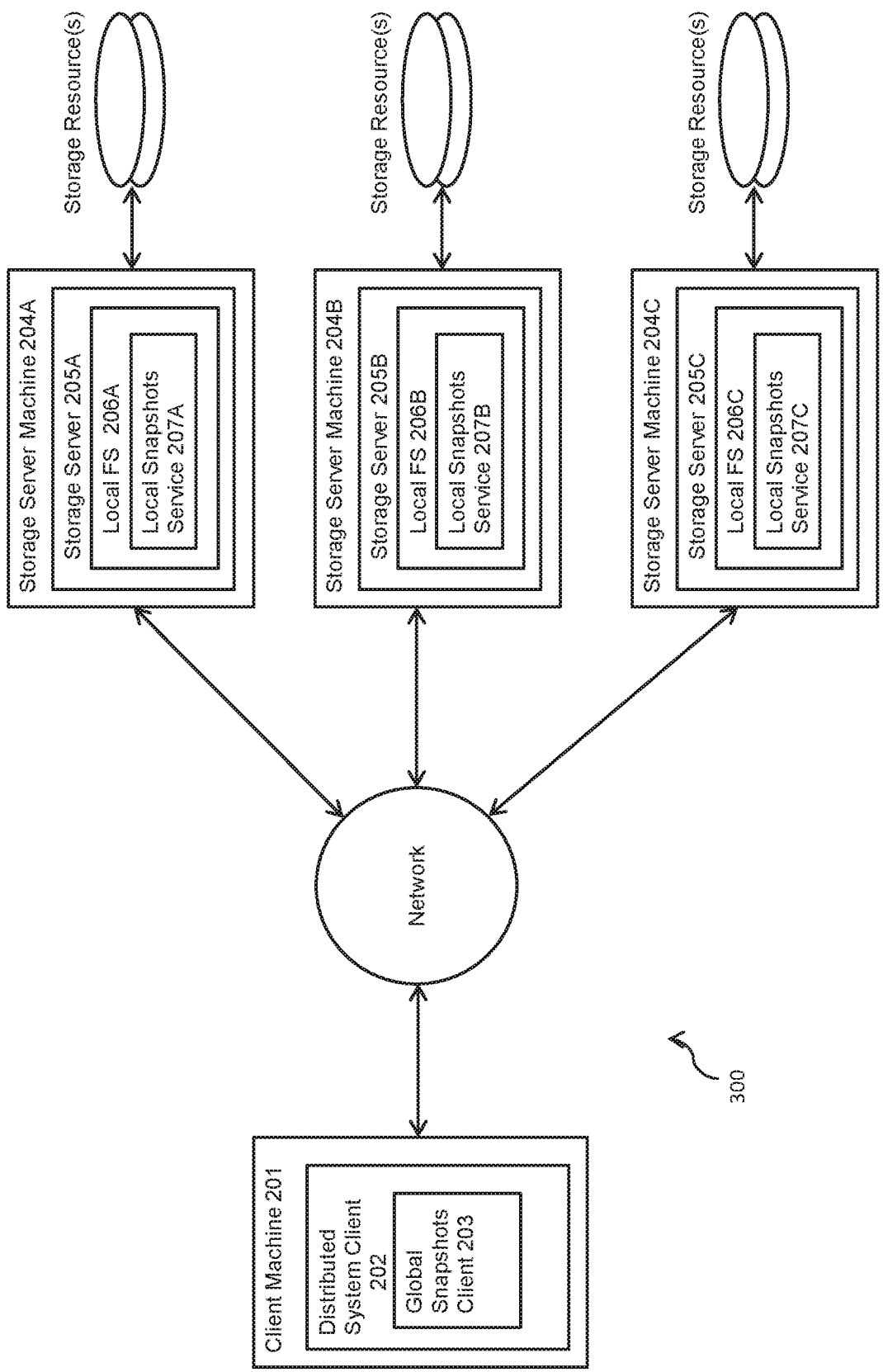
FIG. 3 is a schematic illustration of a deployment of a distributed storage system with a global snapshot functionality.

FIG. 3 is schematic illustration of an example of a deployment of a distributed storage system 300 that comprises a global snapshot functionality. The distributed storage system comprises a client machine 201 which is connected via a network with a first, second and third storage server machine 204A, 204B, 204C. Each of the storage server machines is connected with corresponding storage resources.

The global snapshot manager 101 can operate on the client machine 201 as a part 203 of a distributed system client 202. Storage servers 205A, 205B, 205C working on the storage server machines 204A, 204B, 204C, receive requests issued by the distributed system client 202 and redirect them to the backend storage modules 206A, 206B, 206C, which can be local file systems. Local snapshot services 207A, 207B, 207C of the backend storage modules 206A, 206B, 206C can be implemented as described in Rodeh, O., 2008. B-trees, shadowing, and clones. ACM Transactions on Storage (TOS), 3(4), p. 2.

Figure 4:
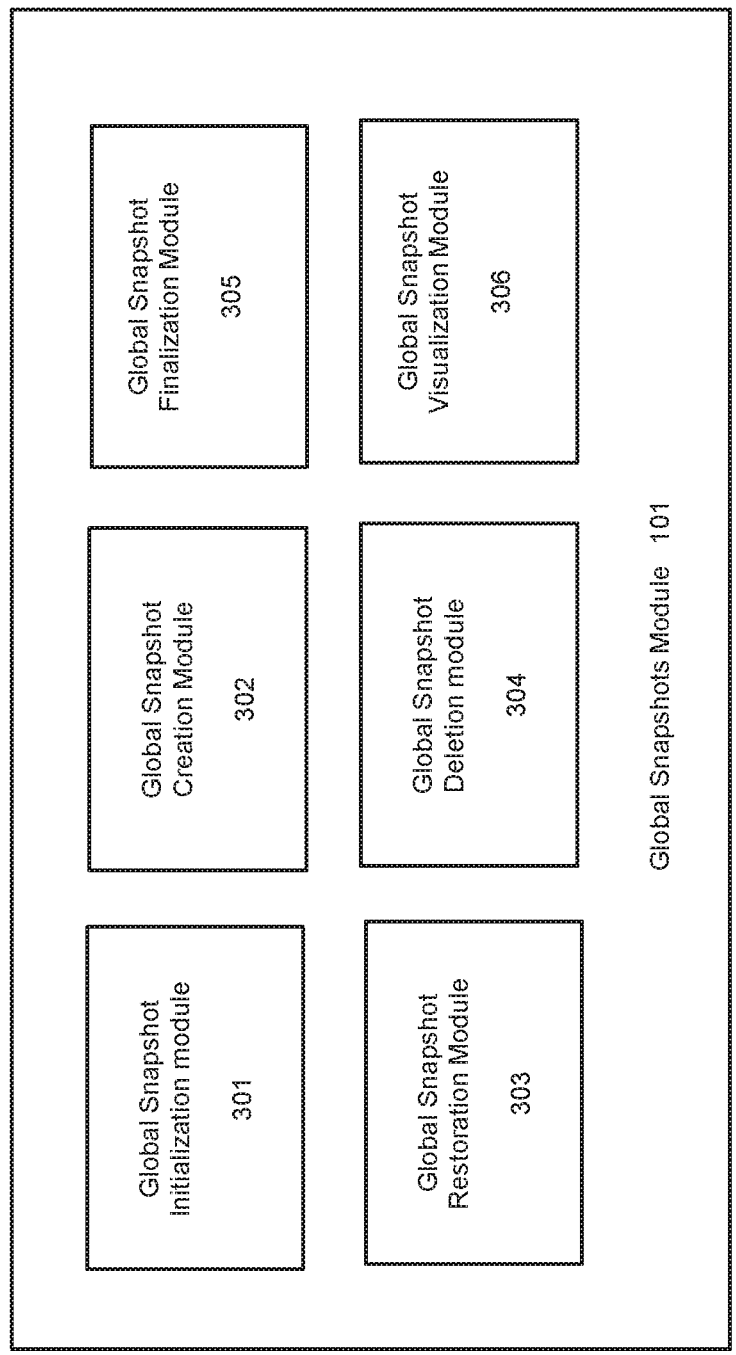
FIG. 4 is a schematic illustration of a global snapshots module.

FIG. 4 is a block diagram of a global snapshots module 101, which comprises a global snapshot initialization module 301, a global snapshot creation module 302, a global snapshot restoration module 303, a global snapshot deletion module 304, a global snapshot finalization module 305 and a global snapshot visualization module 306. These modules 301-306 can be implemented on a common processor.

Figure 5:
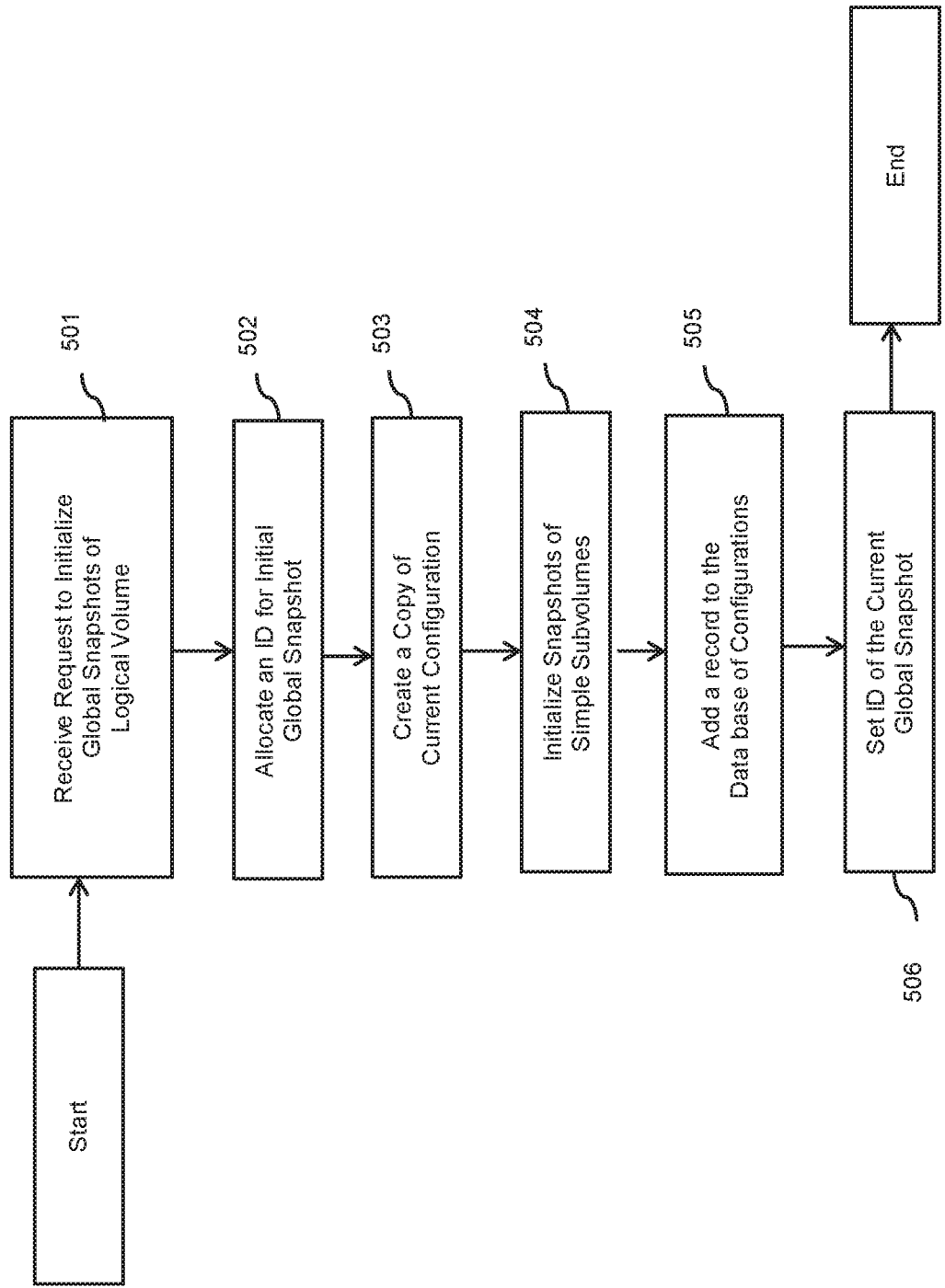
FIG. 5 is a flow chart illustrating a method that can be executed on a global snapshot initialization module.

FIG. 5 is a flow chart of a method 500 executed on a snapshot initialization module.

In a first step 501, processing logic receives a request to initialize a system of global snapshots of the logical volume. This request can contain various properties of the initial global snapshot (for example, is the snapshot writable or read-only) to be created.

In a second step 502, processing logic allocates an ID for the initial global snapshot. Then processing logic creates a root node of the tree of snapshots with a single item in that node. That item is marked by the ID allocated at the beginning of this step. That item can include any information about the initial global snapshot passed at the first step.

In a third step 503, processing logic creates a copy of a current configuration 110.

In a fourth step 504, processing logic for each simple subvolume determined by the current configuration 110 asks its manager 105 for snapshot initialization service.

In a fifth step 505, processing logic stores the ID generated at the second step and the copy of current distributed configuration, created in the third step, in the key-value store 106 (so that the ID is the key and a copy of the configuration is the value).

In a sixth step 506, processing logic sets a version of the current global snapshot to the ID generated at the step 1 and properties passed at the step 1. With this step, the method ends.

Figure 6:
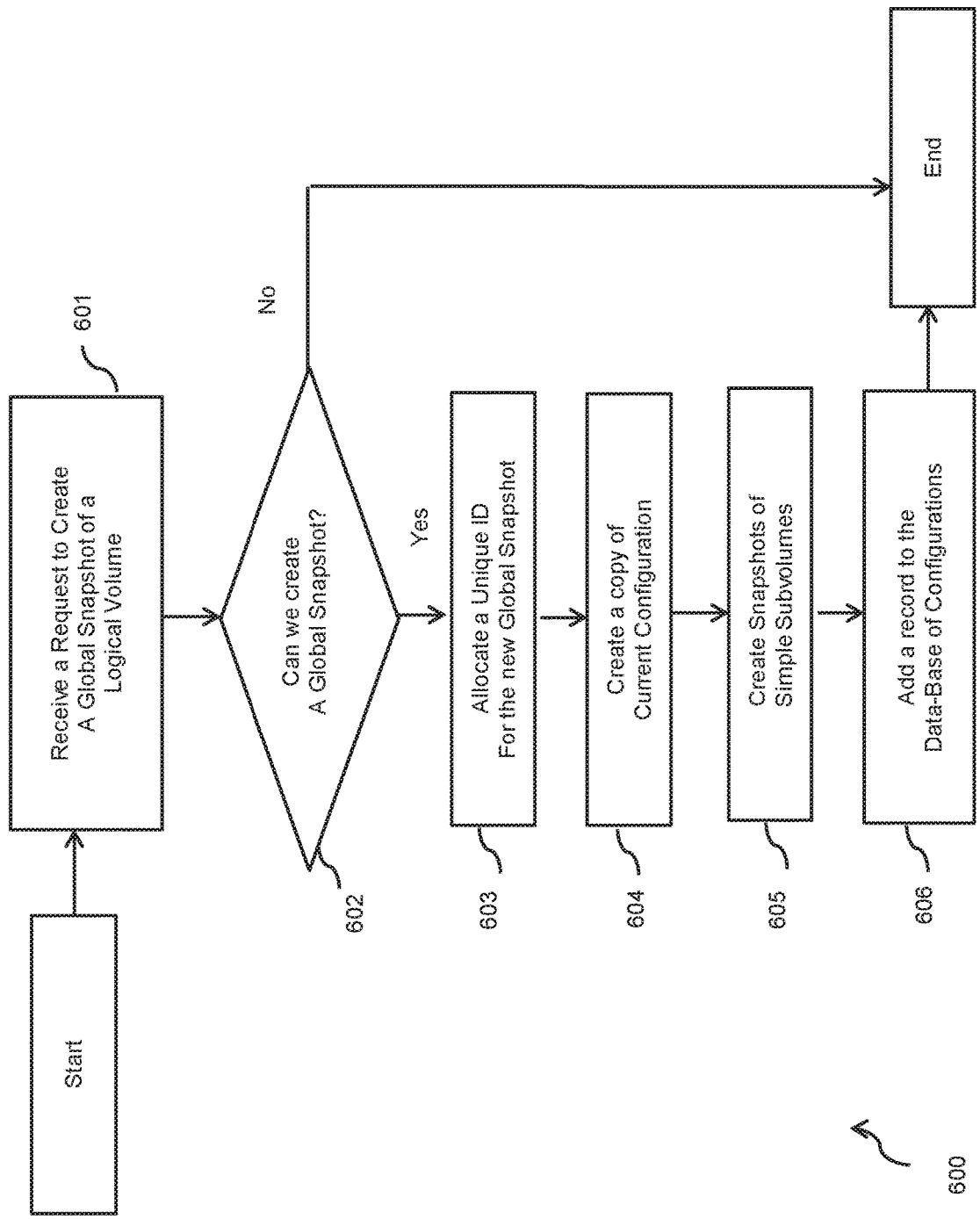
FIG. 6 is a flow chart illustrating a method that can be executed on a global snapshot creation module.

FIG. 6 is a flow chart of a method carried out on a snapshot of a creation module.

In a first step 601, processing logic receives a request to create a global snapshot with specified properties of the logical volume.

In a second step 602, processing logic checks if the new snapshot can be created. In particular, it can depend on the properties 109 of the currently deployed snapshot. For example, if the current snapshot is read-only, then processing logic may decide that the new snapshot cannot be created. In this case processing logic finishes calculation and may generate an error message.

In a third step 603, processing logic allocates a unique ID, which is different from all the keys stored in the module 106. In the tree of snapshots 112, processing logic is looking for the child node for the item with the ID determined by the ID and properties of the current global snapshot 109. If such node does not exist, processing logic creates it. In that node processing logic creates an item marked by the ID allocated at the beginning of this step. In the created item the processing logic can store any properties of the new snapshot passed to the processing logic at step 1 (for example, is the new snapshot writable, or read-only).

In a fourth step 604, processing logic creates a copy of the current configuration 110.

In a fifth step 605, processing logic for each currently available simple volume asks its manager 105 for a snapshot creation service and increments reference counter of the volume. The set of currently available simple volumes is determined by the current configuration 110 as described above.

In a sixth step 606, processing logic stores the ID generated at step 1 and a copy of current configuration (created at step 2) in the key-value store 106 (the data base), so that ID is the key and the copy is the value.

Figure 7:
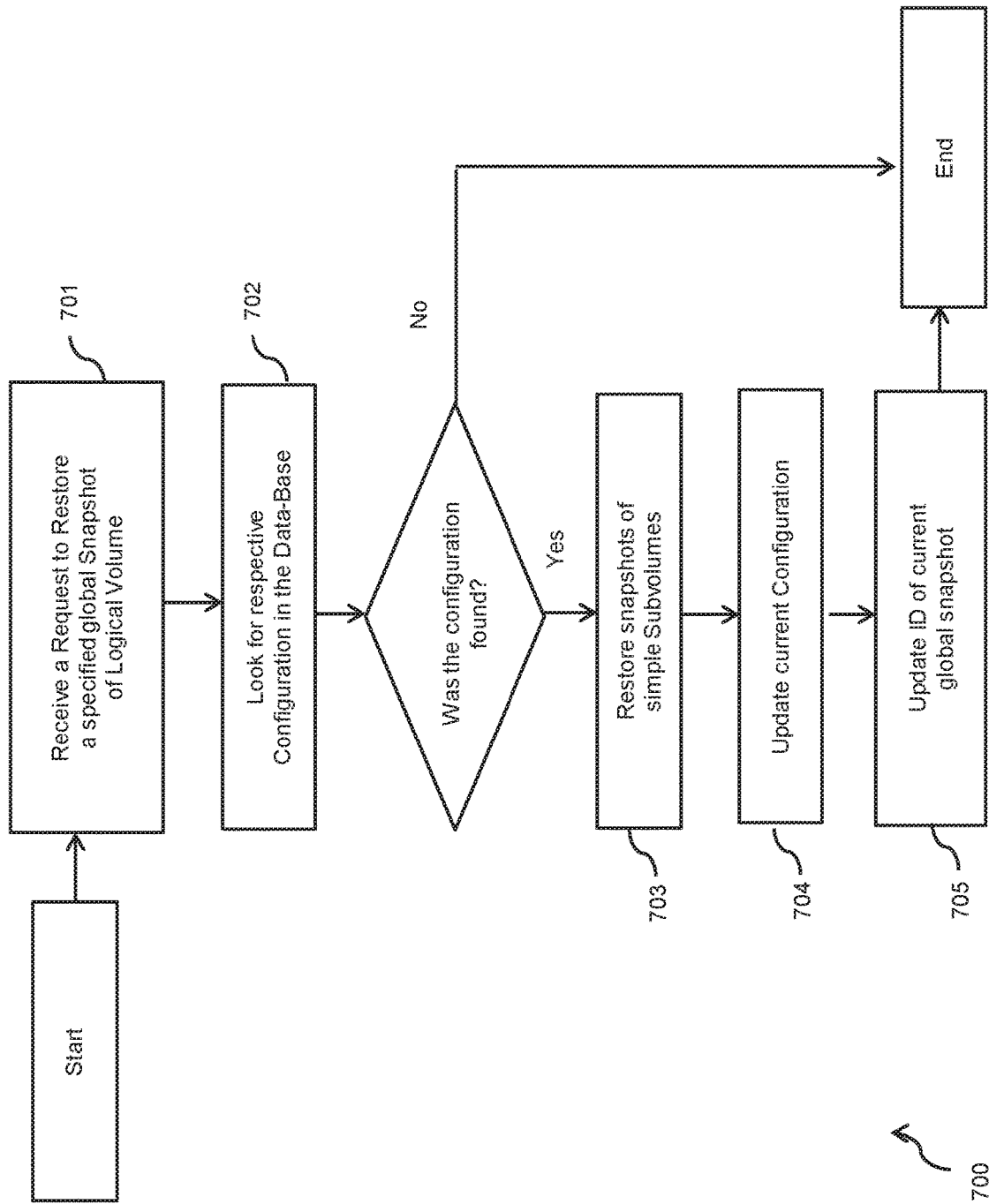
FIG. 7 is a flow chart illustrating a method that can be executed on a global snapshot restoration module.

FIG. 7 is a flow chart of a method carried out on a snapshot of a restoration module.

In a first step 701, processing logic receives a request to restore a snapshot of a specified ID passed as input argument.

In a second step 702, processing logic is looking for a key-value pair by the key provided at the step 1 (as passed snapshot ID). Then processing logic is looking for the respective item in the tree of snapshots 112.

In a third step 703, processing logic by the configuration found at step 2 determines a set of simple volumes and for each such volume asks its manager 105 for a restoration service.

In a fourth step 704, processing logic updates the current configuration 110 with the configuration found at step 2.

In a fifth step 705, processing logic updates 109 with the ID provided at step 1 and the properties found at step 2.

Figure 8:
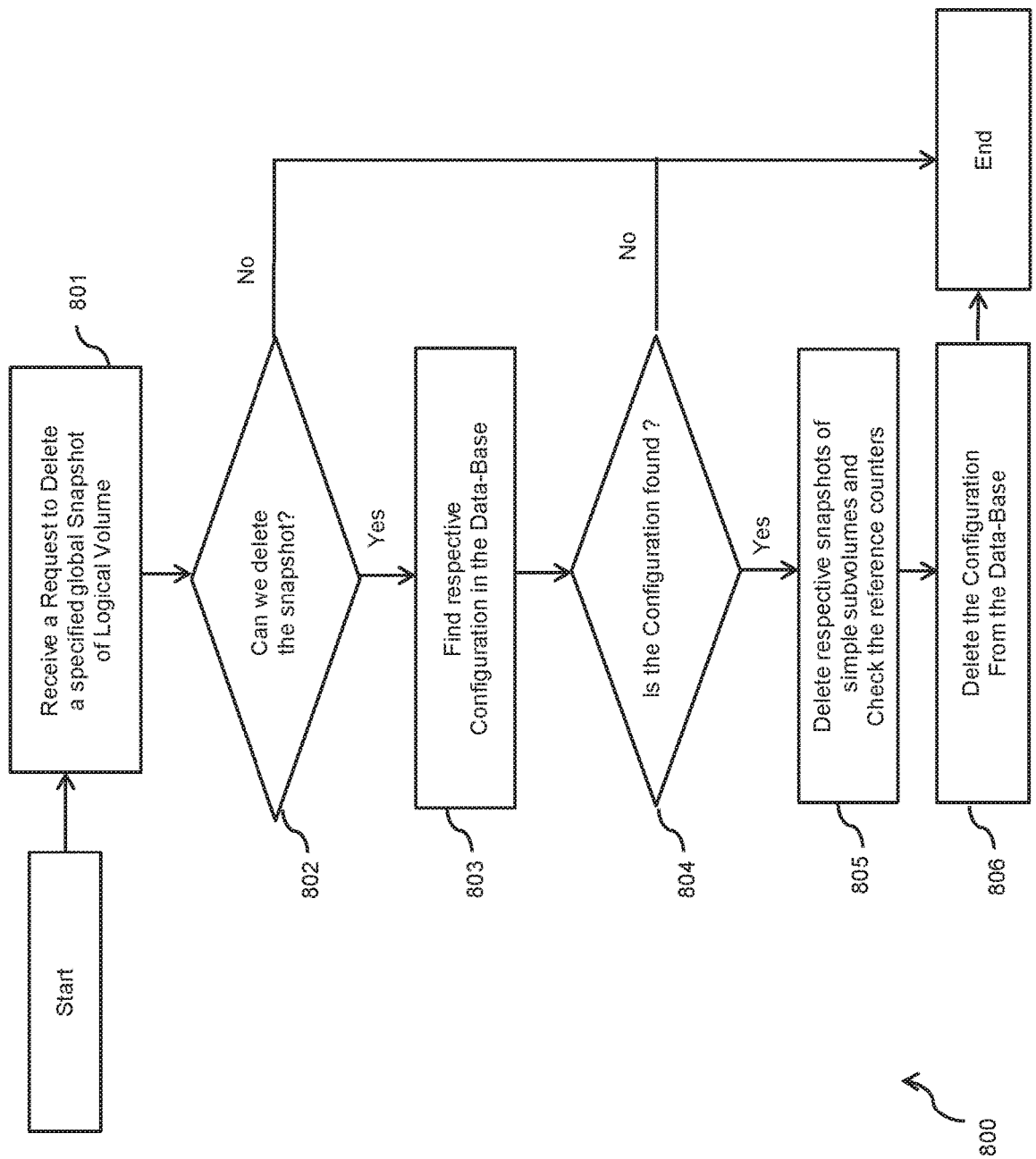
FIG. 8 is a flow chart illustrating a method that can be executed on a global snapshot deletion module.

FIG. 8 is a flow chart of a method carried out on a snapshot of a deletion module.

In a first step 801, processing logic receives a request to delete a snapshot of specified ID passed as input argument.

In a second step 802, processing logic checks if the ID passed at step 1 coincides with the ID of current global snapshot 109. If yes, then processing logic informs the user that deletion is impossible and finishes. Optionally in this case processing logic can suggest the user to switch to some another snapshot (if any), using restoration module 303, to make deletion possible.

In a third step 803, processing logic is looking in the data-base 106 for the configuration by the key provided at the step 1 (i.e. by the passed ID).

In a fourth step 804, if nothing was found in the result of third step 803, then processing logic informs the user about an error and finishes.

In a fifth step 805, processing logic determines a set of simple volumes by the configuration found at step 3, and for each of those volumes performs the following actions:
a) ask the volume manager 105 for deletion service. Specifically, the processing logic asks to delete a simple volume's snapshot of the ID provided at step (1);
b) decrement reference counter of the simple volume;
c) check if the counter in the result of (b) became zero. If so, then processing logic informs the user that the volume is not in use anymore, so that all resources associated with that volume can be released and the corresponding storage device 107 can be safely removed from the machine.

In a sixth step 806, processing logic deletes the configuration found at step (3) from the key-value store 106 (the data base). Then processing logic deletes a corresponding item from the tree of snapshots 112 and moves all items of the child node to the parent node. Then processing logic removes the empty child node from the tree 112.

Figure 9:
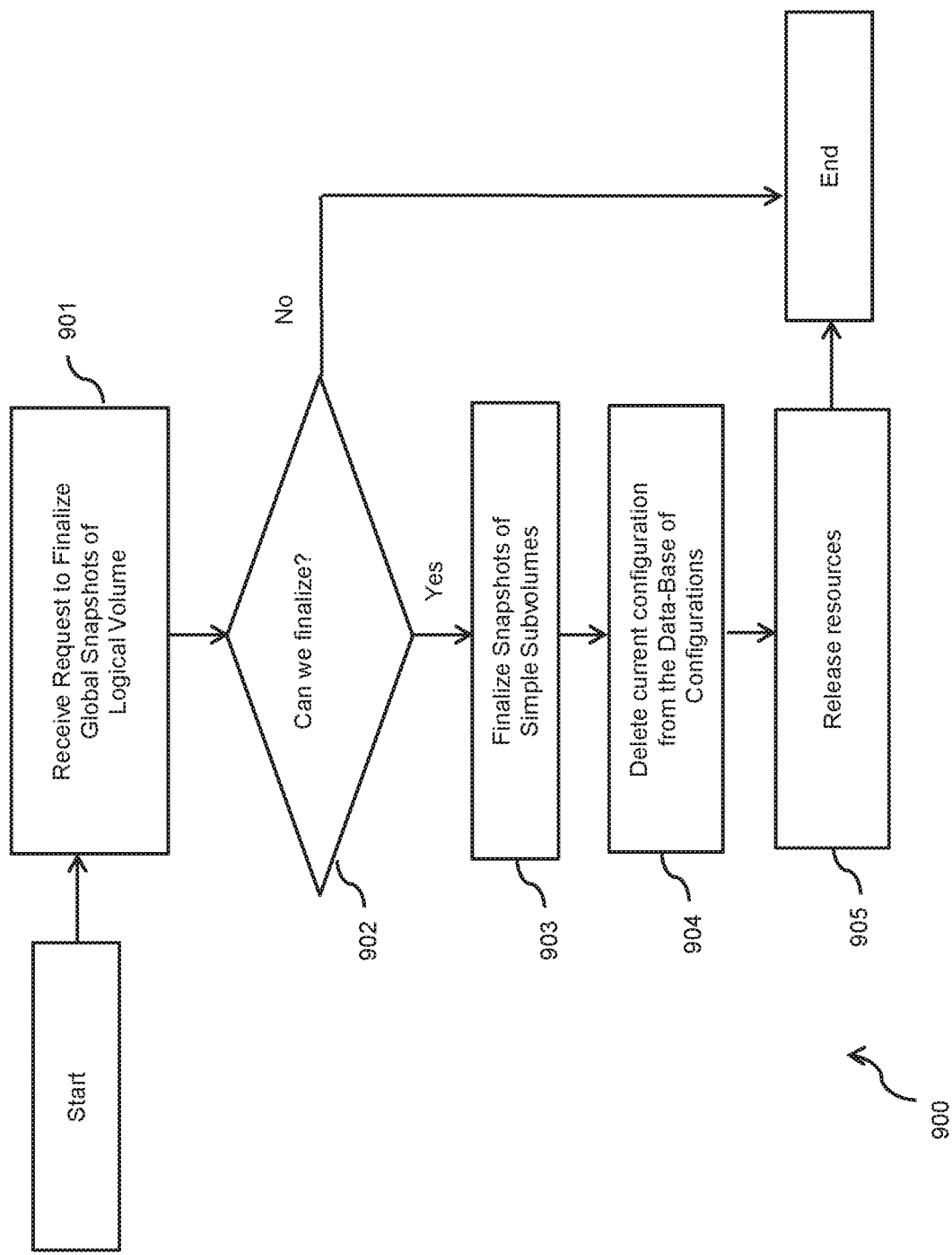
FIG. 9 is a flow chart illustrating a method that can be executed on a global snapshots finalization module.

FIG. 9 is a flow chart of a method carried out on a snapshot of a finalization module.

In a first step 901, processing logic receives a request to finalize a system of global snapshots of a logical volume.

In a second step 902, processing logic checks if 106 contains only one element. If not, then processing logic informs the user about failure and finishes. In this case processing logic, in addition, can suggest user to remove some global snapshots by deletion service 304.

At the beginning of the third step 903, there is only one element in 106. Its key coincides with the identifier 109, and its value coincides with current configuration 110 (this is a property, which can be proven). Moreover, the tree 112 contains only one node with only one item in that node.

In a third step 903, processing logic for each simple volume determined by current configuration 110 asks its manager 105 for snapshots finalization service.

In a fourth step 904, processing logic deletes the single element of the archive of configurations 106 (data base) and the single node of the tree of global snapshots 112.

In a fifth step 905, processing logic releases all resources allocated in the archive of configurations 106, for the ID and properties of the current global snapshot 109 and the tree of global snapshots 112.

Figure 10:
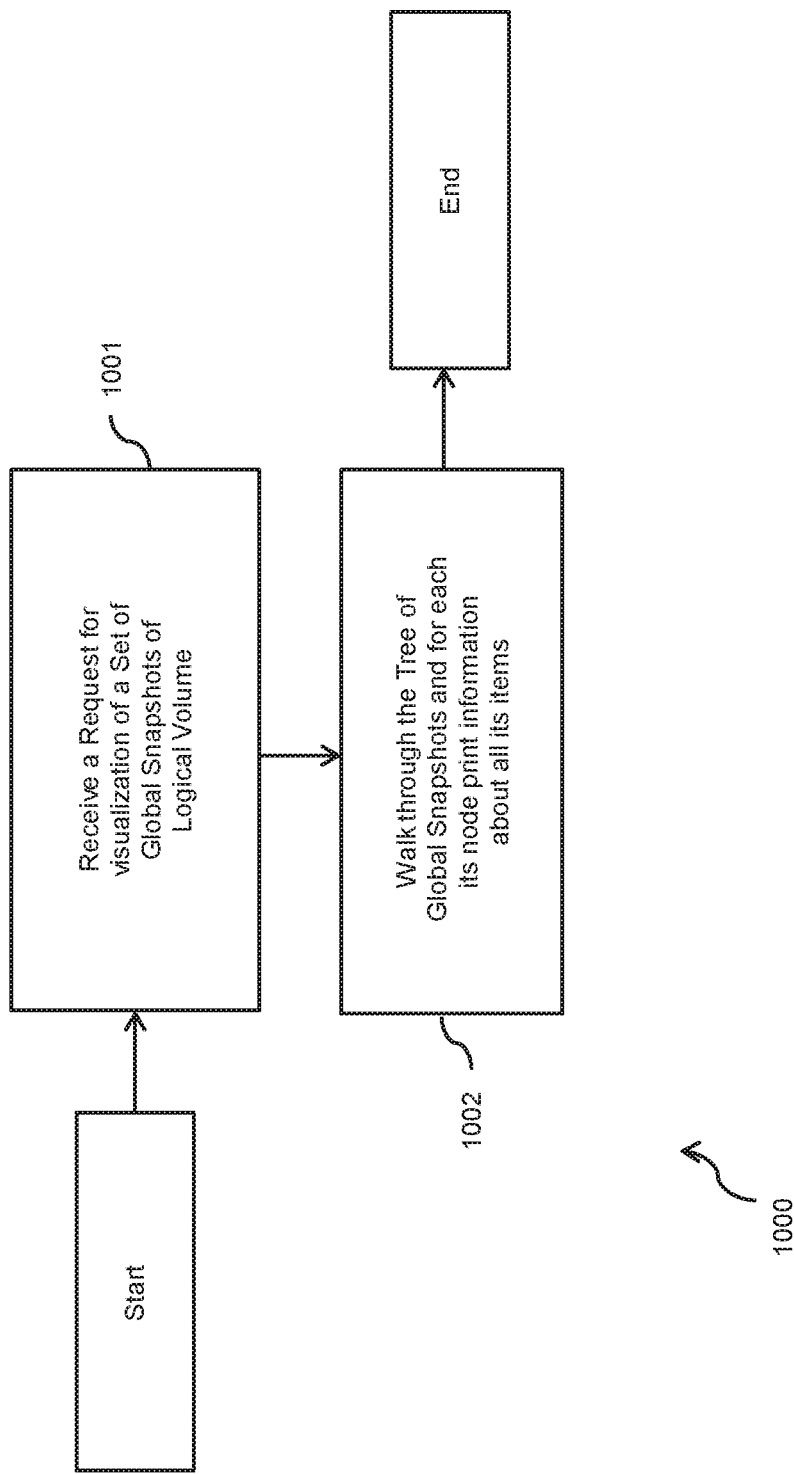
FIG. 10 is a flow chart illustrating a method that can be executed on a global snapshots visualization module.

FIG. 10 is a flow chart of a method 1000 carried out on a snapshot of a visualization module.

In a first step 1001, processing logic receives a request to visualize the system of global snapshots.

In a second step 1002, processing logic scans the tree of snapshots 112 in some order and prints information about each of its items.

Figure 11:
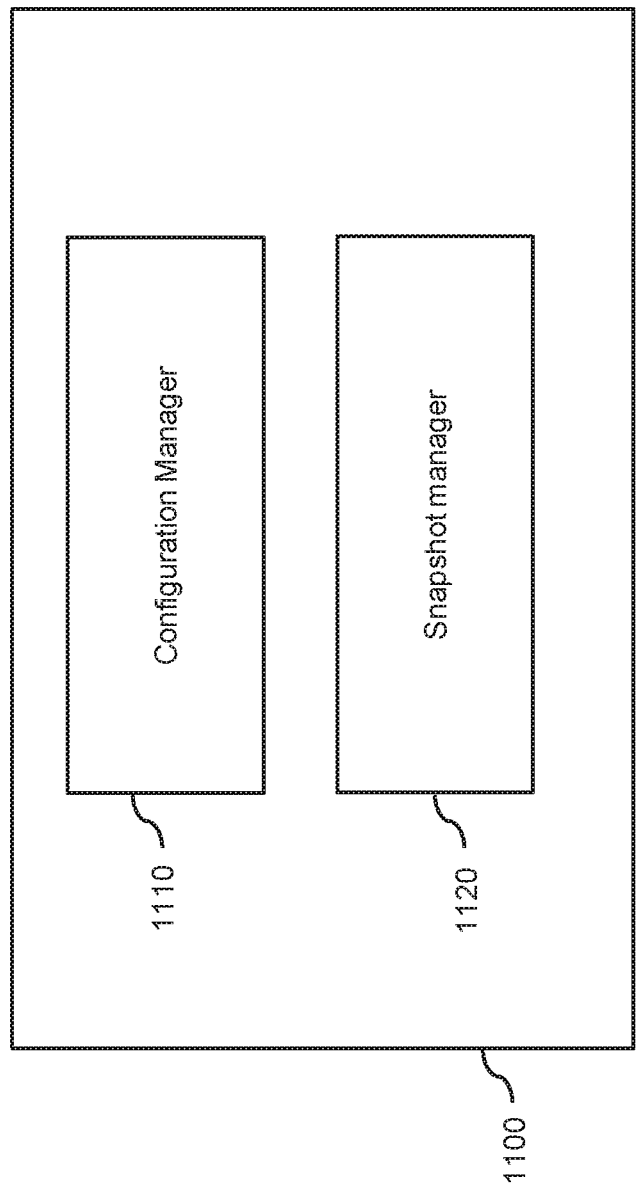
FIG. 11 is a block diagram illustrating a storage manager.

FIG. 11 shows a storage manager 1100 for managing storage of files on a distributed logical volume.

The storage manager comprises a configuration manager 1110 and a snapshot manager 1120.

The configuration manager 1110 is configured to manage an archive of configurations of the distributed logical volume.

The snapshot manager 1120 is configured to create a global snapshot of the distributed logical volume and, in response to a roll-back request, restore a previous global snapshot of the distributed logical volume, based on a stored configuration of the distributed logical volume and stored subvolume snapshots of subvolumes of the distributed logical volume.

Suppose a user has a logical distributed volume V which comprises two devices D1 and D2.

Each device is associated with an individual subvolume managed by module 104.

At moment T0, the user puts three files F1, F2 and F3 to V. In accordance with a current configuration C0 of V, F1 is stored on D1; F2 and F3 are stored on D2. Specifically, 102 transmits a request for 104 to store F1 on D1, and requests to store F2 and F3 on D2.

At moment T1, the user creates a global snapshot of V. The snapshot creation module 303 (see the full description of the flow chart) allocates a unique snapshot-ID S1(V) and transmits requests for 104 to make snapshots S1(D1) and S1(D2) of individual subvolumes D1 and D2 respectively. Also the module 303 creates a copy of the current configuration C0 of V and puts it to the archive 106.

At moment T2, the user adds one more device D3 to V. The volume operation of adding a device (module 102) creates a new configuration C1 of V. In accordance with that new configuration, file F1 is relocated to D3, file F3 is relocated to D1, and file F2 remains on D2. So, the volume operation of adding a device spawns a set of regular file operations on the individual subvolumes. Specifically: 1) F1 was created on V3; 2) F1 was deleted from V1; 3) F3 was created on D1; 4) F3 was deleted from D2. The snapshot manager 105 of individual subvolumes keeps a track of those regular file operations on the individual subvolumes.

At moment T3, the user creates a file F4 on V (which already comprises three devices). In accordance with a current configuration C1 of V the file F4 will be stored on D3.

At moment T4, the user creates a snapshot S2 of V.

At moment T5, the user rolls his logical volume V back to the global snapshot S1 created at moment T1. The restoration module 303 picks up the configuration C0 from the archive 106 and transmits requests to the individual subvolumes D1 and D2 to perform corresponding rollbacks to snapshots S1 (D1) and S1(D2) respectively. After performing the rollbacks, D1 contains the file F1, D2 contains files F2 and F3 (as it was at the moment T1).

At moment T6, the user wants to play a movie contained in the file F4. However, the user meets a failure: F4 is not found. Indeed, the logical volume V was rolled back to the past state that V had at moment T1 (at that moment V did not have the file F4). To get the file F4 back the user has to roll V back to the snapshot S2. Note that at current moment logical volume is composed of two devices D1 and D2, as it is described by the configuration C0. In spite of the fact that currently V is composed of two devices D1 and D2, the user cannot remove device D3 from the machine: the snapshot S2 still refers to this device.

At moment T7, the user deletes a global snapshot S2. Module 304 removes the copy of the configuration C1 from the archive 106 and decrements the reference counter of the individual subvolumes D1, D2 and D3. As a result, the reference counter of D3 becomes zero and module 304 informs the user that device D3 is not used by anyone and can be removed from the machine.

Finally, at moment T8, the user can safely remove physical device D3. Note that after moment T7 file F4 is lost forever. Also note that if the user had not made a global snapshot S2 at moment T4, then he would have lost F4 already right at moment T5.

The foregoing descriptions are only implementation manners of the present invention, the scope of the present invention is not limited to this. Any variations or replacements can be easily made through person skilled in the art. Therefore, the protection scope of the present invention should be subject to the protection scope of the attached claims.

What is claimed is:

1. A storage management system comprising:
a processor; and
a non-transitory computer-readable medium including computer-executable instructions that, when executed by the processor, cause the system to carry out managing storage of files on a distributed logical volume comprising a plurality of subvolumes, the managing storage of files comprising:
managing an archive of configurations of the distributed logical volume; and
creating a global snapshot of the distributed logical volume, and
restoring, in accordance with a roll-back request, a previous global snapshot of the distributed logical volume based on:
a stored configuration of the distributed logical volume, and
one or more stored subvolume snapshots,
wherein each snapshot of the one or more stored subvolume snapshots is a snapshot of a respective subvolume of the distributed logical volume,
wherein the managing storage of files further comprises:
managing a subvolume snapshot of a respective subvolume of the distributed logical volume, and
transmitting a request to perform an operation on the managed subvolume snapshot.

2. The storage management system of claim 1, wherein the managing storage of files further comprises keeping a reference counter of a respective subvolume of the distributed logical volume, wherein the reference counter indicates a number of stored global snapshots that include a subvolume snapshot of the respective subvolume.

3. The storage management system of claim 1, wherein the managing storage of files comprises, in accordance with a global snapshot creation request, performing:
storing information about a current configuration of the distributed logical volume,
transmitting a request to create a current snapshot of each of one or more respective subvolumes of the distributed logical volume, and
creating a unique ID corresponding to the stored information and a current global snapshot.

4. The storage management system of claim 1, wherein the managing storage of files comprises, in accordance with a global snapshot deletion request, performing:
deleting information about a corresponding configuration of the distributed logical volume, and
transmitting a request to delete one or more subvolume snapshots of a stored global snapshot.

5. The storage management system of claim 1, wherein the managing storage of files comprises, in accordance with a global snapshot restoration request, performing:
restoring a corresponding configuration of a distributed storage volume, and
transmitting a request to restore one or more respective subvolume snapshots on one or more respective subvolumes of the distributed logical volume.

6. The storage management system of claim 1, wherein the managing storage of files comprises:
parsing a data structure comprising information about stored global snapshots, and
displaying a parsing result.

7. The storage management system of claim 1, wherein the managing storage of files comprises:
allocating resources, and
creating data structures for managing global snapshots.

8. The storage management system of claim 7, wherein the managing storage of files comprises releasing the resources allocated by the global snapshot initialization module.

9. A method for managing storage of files on a distributed logical volume having a plurality of subvolumes, the method comprising:
managing an archive of configurations of the distributed logical volume;
creating a global snapshot of the distributed logical volume; and
restoring, in accordance with a roll-back request, a previous global snapshot of the distributed logical volume based on:
a stored configuration of the distributed logical volume, and
one or more stored subvolume snapshots,
wherein each snapshot of the one or more stored subvolume snapshots is a snapshot of a respective subvolume of the distributed logical volume,
wherein the managing storage of files further comprises:
managing a subvolume snapshot of a respective subvolume of the distributed logical volume, and
transmitting a request to perform an operation on the managed subvolume snapshot.

10. The method of claim 9, further comprising keeping a reference counter of a respective subvolume of the distributed logical volume, wherein the reference counter indicates a number of stored global snapshots that comprise a subvolume snapshot of the respective subvolume.

11. The method of claim 9, further comprising, in accordance with a global snapshot creation request:
storing information about a current configuration of the distributed logical volume;
transmitting a request to create a current snapshot of each of one or more respective subvolumes of the distributed logical volume; and
creating a unique ID corresponding to the stored information and a current global snapshot.

12. The method of claim 9, further comprising, in accordance with a global snapshot deletion request:
deleting information about a corresponding configuration of the distributed logical volume; and
transmitting a request to delete one or more subvolume snapshots of a stored global snapshot.

13. The method of claim 9 wherein the method comprises, in accordance with a global snapshot restoration request, performing:
restoring a corresponding configuration of a distributed storage volume, and
transmitting a request to restore one or more respective subvolume snapshots on one or more respective subvolumes of the distributed logical volume.

14. The method of claim 9, further comprising:
parsing a data structure comprising information about stored global snapshots, and
displaying a parsing result.

15. The method of claim 9 further comprising:
allocating resources, and
creating data structures for managing global snapshots.

16. The method of claim 15, further comprising releasing the resources allocated by the global snapshot initialization module.

17. A non-transitory computer-readable storage medium storing program code, the program code comprising instructions that, when executed by a processor, cause the processor to carry out a method for managing storage of files on a distributed logical volume having a plurality of subvolumes, the method comprising:
managing an archive of configurations of the distributed logical volume;
creating a global snapshot of the distributed logical volume; and
restoring, in accordance with a roll-back request, a previous global snapshot of the distributed logical volume based on:
a stored configuration of the distributed logical volume, and
one or more stored subvolume snapshots,
wherein each snapshot of the one or more stored subvolume snapshots is a snapshot of a respective subvolume of the distributed logical volume,
wherein the managing storage of files further comprises:
managing a subvolume snapshot of a respective subvolume of the distributed logical volume, and
transmitting a request to perform an operation on the managed subvolume snapshot.

18. The non-transitory computer-readable storage medium of claim 17, wherein the method further comprises keeping a reference counter of a respective subvolume of the distributed logical volume, wherein the reference counter indicates a number of stored global snapshots that comprise a subvolume snapshot of the respective subvolume.

19. The non-transitory computer-readable storage medium of claim 17, wherein, in accordance with a global snapshot creation request, the method further comprises:
storing information about a current configuration of the distributed logical volume;
transmitting a request to create a current snapshot of each of one or more respective subvolumes of the distributed logical volume; and
creating a unique ID corresponding to the stored information and a current global snapshot.

20. The non-transitory computer-readable storage medium of claim 17, wherein the method further comprises, in accordance with a global snapshot deletion request:
deleting information about a corresponding configuration of the distributed logical volume; and
transmitting a request to delete one or more subvolume snapshots of a stored global snapshot.

* * * * *